United States Patent [19]
Orensteen et al.

[11] Patent Number: 5,508,105
[45] Date of Patent: Apr. 16, 1996

[54] THERMAL PRINT RECEPTIVE AND FRANGIBLE RETROREFELECTIVE POLYMERIC SHEETINGS

[75] Inventors: Bruce D. Orensteen, St. Paul; Thomas F. Look, Ham Lake; Robert F. Watkins, Roseville; Joseph M. McGrath, Lake Elmo; Robert V. O'Keefe, New Brighton; Joseph R. Zwack, Roseville, all of Minn.

[73] Assignee: Minnesota Mining and Manufacturing Company, St. Paul, Minn.

[21] Appl. No.: 186,751

[22] Filed: Feb. 2, 1994

Related U.S. Application Data

[63] Continuation-in-part of Ser. No. 33,627, Mar. 16, 1993, abandoned, which is a continuation-in-part of Ser. No. 17,573, Feb. 16, 1993, abandoned.

[51] Int. Cl.$^6$ ........................................... B32B 5/16
[52] U.S. Cl. .................. 428/323; 428/195; 428/325; 428/327; 428/411.1; 428/423.1; 428/424.2; 428/500; 428/522; 428/913
[58] Field of Search ........................... 428/323, 331, 428/402, 913, 40, 204, 195, 411.1, 325, 327, 423.1, 424.2, 500, 522; 524/493, 847; 359/536

[56] References Cited

U.S. PATENT DOCUMENTS

| | | | |
|---|---|---|---|
| 3,765,994 | 10/1973 | Quaintance et al. | 161/6 |
| 4,082,873 | 4/1978 | Williams | 428/40 |
| 4,214,028 | 7/1980 | Shortway et al. | 428/159 |
| 4,456,667 | 6/1984 | Bochow et al. | 430/10 |
| 4,557,505 | 12/1985 | Schaefer et al. | 283/81 |
| 4,567,072 | 1/1986 | Brainard et al. | 428/40 |
| 4,686,898 | 8/1987 | LaManna et al. | 101/18 |
| 4,755,425 | 7/1988 | Huang | 428/331 |
| 4,841,652 | 6/1989 | Sakashita et al. | 40/299 |
| 4,844,976 | 7/1989 | Huang | 428/323 |
| 4,970,655 | 11/1990 | Winn et al. | 364/479 |
| 5,015,318 | 5/1991 | Smits et al. | 156/233 |

(List continued on next page.)

FOREIGN PATENT DOCUMENTS

| | | |
|---|---|---|
| 0195949 | 10/1986 | European Pat. Off. . |
| 0283861A1 | 9/1988 | European Pat. Off. . |
| 0359532A2 | 3/1990 | European Pat. Off. . |
| 0404539A3 | 12/1990 | European Pat. Off. . |
| 0411152A1 | 2/1991 | European Pat. Off. . |
| 0459720A1 | 12/1991 | European Pat. Off. . |
| 2831587A1 | 1/1980 | Germany . |
| 3902729C1 | 3/1990 | Germany . |
| 5-14882 | 2/1993 | Japan .................. G02B 5/128 |

OTHER PUBLICATIONS

Markem Corporation product literature for LP8400 thermal transfer apparatus (May 1992).
"Printer ribbon re–inker handles all shapes and sizes," *Design Engineering*, vol. 232, Sep. 1991, London, GB, p. 18, XP238119.
3M product literature for 3M's Retro–Reflective Label Stock.

*Primary Examiner*—Patrick J. Ryan
*Assistant Examiner*—William A. Krynski
*Attorney, Agent, or Firm*—Gary L. Griswold; Walter N. Kim; Robert H. Jordan

[57] ABSTRACT

Polymeric sheeting materials directly thermally printed upon with a thermal printing system and a resin-based colorant/binder. The polymeric sheeting materials comprise a core sheet and a thermally print receptive surface on the core sheet. The thermally print receptive surface may be formed from compositions comprising a polyurethane dispersion. The thermally print receptive surface is smooth, transparent, durable, and weatherable.

Signage articles made from the polymeric sheeting materials of the invention may be configured to have the desired combination of frangibility, durability, retroreflectivity and/or low production cost. Frangible, retroreflective signage articles may be produced from the polymeric sheeting materials and may have durable variable information thermally and variably printed directly on the articles.

37 Claims, 3 Drawing Sheets

U.S. PATENT DOCUMENTS

| | | | |
|---|---|---|---|
| 5,028,290 | 7/1991 | Curiel | 156/232 |
| 5,073,404 | 12/1991 | Huang | 427/39 |
| 5,080,463 | 1/1992 | Faykish et al. | 359/536 |
| 5,085,918 | 2/1992 | Rajan et al. | 428/195 |
| 5,118,930 | 6/1992 | Takada | 235/462 |
| 5,149,386 | 9/1992 | Smits et al. | 156/150 |
| 5,149,571 | 9/1992 | Croell | 428/40 |
| 5,349,534 | 9/1994 | Rousseff et al. | 364/479 |

THERMAL PRINT RECEPTIVE AND FRANGIBLE RETROREFELECTIVE POLYMERIC SHEETINGS

This is a continuation-in-part of U.S. patent application Ser. No. 08/033,627, filed Mar. 16, 1993, which is a continuation-in-part of U.S. patent application Ser. No. 08/017,573, filed Feb. 16, 1993. The disclosures of these applications are incorporated herein by reference.

FIELD OF THE INVENTION

This invention relates to polymeric sheeting materials capable of directly receiving a thermally printed indicia from a resin-based colorant/binder. The invention further relates to sheetings that form frangible, retroreflective, weatherable and/or durable signage articles, comprising multi-function layers that are directly print receptive with resin-based colorant/binder on the upper, exposed surface.

BACKGROUND OF THE INVENTION

Polymeric sheetings have been used in situations where a frangible signage article is desired. Frangible signage articles often are capable of being affixed to a surface, yet are easily damaged or torn when an attempt is made to remove or alter them. Frangibility is generally desired for security reasons, for example, to inhibit fraud, and may be provided to a signage article by thinness, deformability, strong adhesion to the substrate to which an article is affixed, brittleness, and/or ease of separation of various layers of an article.

Polymeric sheetings also have been used to produce signage articles that have retroreflective capabilities. An article possesses a retroreflective capability when it can return a substantial portion of incident light in the direction from which the light originated. Retroreflectivity renders enhanced conspicuity to the article in low or restricted lighting situations, or in situations where sheeting materials must be viewed from a distance.

Polymeric sheetings also have been used to produce signage articles that have good durability. Durability of a signage article may be important in situations where the article may be exposed to harsh vapors, ultraviolet light, temperature or humidity extremes and the like. Abrasion resistance and resistance to cleaning agents and the solvents used in cleaning solutions also are, in some cases, important aspects of durability. If extended useful life is not an important consideration (such as labels for rapid turnover packaging), lower cost non-extended life sheetings may be used.

Polymeric sheetings also have been used to form signage articles having indicia such as alphanumeric characters, bar codes or graphics. Frequently, the signage articles will carry information that is repeated or incrementally varied over a large number of items; for instance, license plate validation stickers may have state or county identifying information repeated on a large number of validation stickers.

Indicia may be printed on the polymeric signage articles by such well known processes as letter press, offset press, screen printing, or hot foil stamping. These types of printing processes normally provide satisfactory print quality, legibility, and adhesion; however, the equipment for these processes can be relatively expensive. In addition, when using letter press and offset press printing, print plates or rubber blankets must be prepared, and when using screen or hot stamp printing, a screen or hot stamp, respectively, must be prepared. The preparation of the plates, blankets, screens, or stamps can be a costly, time-consuming process. In many cases, a solvent-borne colorant is used, which requires disposing of the solvent in an environmentally-sound manner. Known processes also may necessitate the use of drying ovens and may require a certain amount of drying time. Further, the known means of printing indicia on articles are limited by the ease (or lack thereof) with which the information on individual items can be varied.

The documents discussed below contain disclosures that may be pertinent to the present invention.

U.S. Pat. No. 5,118,930 to Takada discloses a retroreflective sheeting using a polyvinyl chloride topmost layer upon which bar codes may be directly thermally printed.

Commonly-assigned Patent Cooperation Treaty application to Goeb, having international publication number WO 93/12155, discloses label stock having a halogen-free acrylic urethane topmost layer. The application discloses that the additional step of priming the upper surface of the label stock, for example, by corona discharge or with a diluted solution of an acrylate polymer or adhesive, is preferred in order to promote adhesion of inks.

Compositions containing aqueous dispersions of polyurethane and a crosslinker are known to be useful as prime layers between the component layers of multilayer cover films of retroreflective sheetings, or as a prime layer to improve the adhesion of a cover layer to underlying components of the retroreflective sheeting. For instance, commonly-assigned U.S. Pat. No. 4,896,943 to Tolliver et at., discloses encapsulated-lens retroreflective sheetings and the use of a composition containing urethane and crosslinker as a prime layer about 2 microns thick, to improve the adhesion of a cover layer to an underlying binder layer. In addition, commonly-assigned U.S. Pat. No. 5,066,098 to Kult et al., discloses the use of a similar composition as the inner layer of a cover film of an encapsulated-lens retroreflective sheeting.

The above-cited Tolliver patent also discloses the subsequent application of inks to the upper surface of an encapsulated-lens retroreflective sheeting. The Tolliver patent suggests the use of a urethane and aziridine composition to form a conditioning layer on the outside surface of a dual layer cover film of a retroreflective sheeting. However, direct thermal printing is generally difficult on such encapsulated-lens sheetings because of their undulating upper surface. It is known to use a prime layer of a polyurethane about 2 microns thick over an enclosed-lens retroreflective sheeting that has a cover layer such as ethylene/acrylic acid.

U.S. patent application Ser. No. 08/030,672, filed Mar. 12, 1993 by Watkins, et at., (commonly assigned and incorporated herein by reference) discloses compositions comprising an aqueous aliphatic or aromatic polyurethane dispersion and an acrylic emulsion for forming clear coats at least ten microns thick over finished frangible articles having indicia printed thereon. Such clear coats are desired in order to bury or embed the indicia. Watkins, et at., also discusses roll coating of indicia onto embossed, nonfrangible articles having such clear coats.

Commonly-assigned U.S. Pat. No. 4,767,659 to Bailey et at. (incorporated herein by reference) discloses enclosed-lens retroreflective sheetings having a thermoplastic cover film comprised either of aliphatic urethanes, copolymers of ethylene or propylene, or homopolymers of ethylene and propylene. The thermoplastic cover films are formed by extruding onto a carrier web and laminating to a retroreflective base material. The thermoplastic cover films are sufficiently extensible to withstand substantial stretching such as may occur during the embossing of a license plate. The materials also may serve to protect the underlying material against weathering.

FIG. 1 shows a known retroreflective sheeting 12 comprising removable protective liner 14 at the bottommost side, retroreflective element 16, pressure sensitive adhesive layer 26, polyethyleneterephtalate (PET) layer 18 with a thickness of about 25 microns and colorant/binder receptive print layer 20. Retroreflective element 16 comprises a monolayer of glass microspheres 30 embedded in a layer of polyvinyl butyral 34 with underlying reflective layer 32 and pressure sensitive adhesive layer 36. Layer 20 is directly thermally print receptive with a resin-based indicia and is formed from a composition comprising PET and a vinylidine/acrylonitrile copolymer. Sheeting material 12 (manufactured for use as an indoor product ScotchMark™ brand label stock 3929 by Minnesota Mining and Manufacturing Company, St. Paul, Minn.,) is not sufficiently frangible or durable, as defined below, for many applications.

SUMMARY OF THE INVENTION

In this invention, sheetings have been discovered which have a smooth, transparent, durable top layer, and which are directly colorant/binder receptive when a sheeting comprising a core sheet and a topmost layer of the invention is thermally printed thereon with a resin-based colorant/binder. Variable information indicia may be readily formed on sheetings comprising topmost layers of the invention, and the sheetings can be configured to have a desired combination of frangibility, retroreflectivity and enhanced durability and/or weatherability. Because topmost layers of the invention may contribute to the functional properties of polymeric sheetings, formerly provided by layers such as cover layers and/or clear coats, such topmost layers also may be referred to as multi-function layers.

In the present invention, a durable, retroreflective polymeric sheeting material is provided, which comprises: a) a multi-function layer having first and second major surfaces and a thickness of greater than about 6 microns, the multi-function layer being formed from a composition comprising a polyurethane; and b) a core sheet comprising a retroreflective layer and first and second major surfaces, the first major surface of the core sheet being attached to the first major surface of the multi-function layer; wherein the polymeric sheeting is directly thermally print receptive upon the second major surface of the multi-function layer using an indicia that contains a resin-based colorant/binder.

The present invention also provides a frangible, durable, retroreflective polymeric sheeting material, comprising: a) a multi-function layer of greater than about 6 microns in thickness formed from a composition comprising from about 70 to about 100 parts by weight aqueous dispersion of polyurethane, said multi-function layer having first and second major surfaces, the second major surface being directly thermally print receptive with an indicia that contains a resin-based colorant/binder; b) a binder layer comprising synthetic polyester resin crosslinked with a butylated melamine resin and being attached to the first major surface of the multi-function layer; c) a spacecoat layer comprising polyvinyl butyral under said binder layer; d) a monolayer of glass microspheres embedded in the spacecoat layer and in the binder layer; e) a reflective material underlying said monolayer of glass microspheres; and f) a pressure sensitive adhesive layer disposed under the reflective material.

The present invention also provides a frangible, durable, retroreflective polymeric sheeting material, comprising: a) a multi-function layer of greater than about 6 microns in thickness formed from a composition comprising from about 0 to about 60 parts by weight acrylic emulsion and about 40 to about 100 parts by weight aqueous dispersion of polyurethane, said multi-function layer having a lower surface and an exposed, upper surface; b) a binder layer comprising synthetic polyester resin crosslinked with a butylated melamine resin attached to said multi-function lower surface; c) a spacecoat layer comprising polyvinyl butyral under said binder layer; d) a monolayer of glass microspheres having bottommost and topmost surfaces, said bottommost surfaces embedded in said spacecoat layer and said topmost surfaces embedded in said binder layer; e) a reflective material underlying said monolayer of glass microspheres; and f) a pressure sensitive adhesive layer under said reflective material, said polymeric sheeting material being directly thermally print receptive upon said multi-function layer upper surface with an indicia that contains a resin-based colorant/binder. The multi-function layer may be formed from a composition comprising from about 25 to about 50 parts of weight acrylic emulsion and about 40 to about 80 parts by weight aqueous dispersion of polyurethane, which dispersion may comprise from about 45 to about 55 parts of water and from about 30 to about 40 parts of aliphatic polyurethane. The binder layer may comprise polyvinyl butyral or synthetic polyester resin crosslinked with a butylated melamine resin.

The present invention also provides a frangible, retroreflective polymeric sheeting material, comprising: a) a topmost layer having a lower surface and an exposed, upper surface, said topmost layer formed from a composition comprising polyethyleneterephtalate and vinylidine chloride/acrylonitrile copolymer; b) a cover layer attached to said lower surface; and c) a core sheet underlying said cover layer, said polymeric sheeting material being directly thermally print receptive upon said topmost layer upper surface using resin-based colorant/binder. The cover layer of the polymeric sheeting material may be less than about 10 microns in thickness and formed from a composition comprising polyethyleneterephtalate. Alternatively, the cover layer may be formed from a composition comprising an aqueous dispersion of aliphatic polyurethane and an acrylic emulsion. Such a cover layer may be formed from a composition comprising from about 40 to about 100 parts of an aqueous dispersion of polyurethane, the dispersion comprising from about 45 to about 55 parts of water and from about 30 to about 40 parts of aliphatic polyurethane, and from about 0 to about 60 parts of acrylic emulsion. Such polymeric sheeting materials may further comprise resin-based colorant/binder directly applied to the upper exposed surface of the topmost layer. The polymeric sheeting materials comprising resin-based colorant/binder may comprise a signage article. The polymeric sheeting materials less than about 125 microns in thickness may exhibit residual evidence of physical tampering when the sheeting experiences a load at break of less than about 15 pounds.

The present invention also provides a method of making a retroreflective polymeric sheeting material, comprising the steps of: a) providing a core sheet having a retroreflective layer and first and second major surfaces; b) applying a composition comprising a polyurethane onto the first major surface of the core sheet; and c) drying and curing the composition to form a multi-function layer of greater than about 6 microns in thickness having a first and second major surfaces, the first major surface being secured to the core sheet, and the major surface being directly thermally print receptive using a resin-based indicia. The polymeric sheeting material of the method is directly printable using resin-based colorant/binder upon the upper exposed surface of the multi-function layer. The polyurethane composition of the method may comprise from about 70 to about 100 parts by weight aqueous dispersion of polyurethane. The composition may further comprise up to about 5 parts by weight aziridine crosslinker or about 4 parts by weight melamine crosslinker. Alternatively, the composition may comprise from about 0 to about 60 parts by weight acrylic emulsion and from about 40 to about 100 parts by weight aqueous dispersion of polyurethane. The multifunction layer of the polymeric sheeting material of the method may be from about 6 microns to about 35 microns in thickness, preferably from about 7 microns to about 25 microns in thickness, and the sheeting material may be frangible.

The present invention aim provides a method of making a polymeric sheeting material, comprising the steps of: a) providing a removable forming support; b) applying a composition comprising a polyurethane onto said removable forming support; c) drying and curing said composition to yield a multi-function layer of greater than about 6 microns in thickness having first and second major surfaces, the second major surface being disposed on said removable forming support; d) attaching a core sheet comprising a retroreflective layer to said multi-function layer first surface; e) removing said forming support and exposing the second major surface; and f) directly thermally printing an indicia upon the second major surface using resin-based colorant/binder. The composition of the method may comprise from about 70 to about 100 parts by weight aqueous dispersion of polyurethane, which dispersion comprises from about 45 to about 55 parts of water, from about 30 to about 40 parts of aliphatic polyurethane. A composition comprising an aqueous dispersion of polyurethane may further comprise up to about 5 parts by weight aziridine crosslinker or up to about 4 parts by weight melamine crosslinker. Alternatively, the composition of the method may comprise from about 40 to about 100 parts by weight aqueous dispersion of polyurethane, the dispersion comprising from about 45 to about 55 parts of water, from about 30 to about 40 parts of aliphatic polyurethane and from about 0 to about 60 parts by weight acrylic emulsion. The multi-function layer of the method may be from about 6 microns to about 35 microns in thickness, preferably from about 7 microns to about 25 microns, and the sheeting material may be frangible.

The present invention also provides a method of making a retroreflective polymeric sheeting material, comprising the steps of: a) providing a removable forming support; b) applying a composition comprising a polyurethane onto said removable forming support; c) drying and curing said composition to form a multi-function layer of greater than about 6 microns in thickness having a first and second major surfaces, the second major surface being disposed on said removable forming support; d)applying a monolayer of microspheres in a binder layer to said multi-function layer first surface, said microspheres having topmost and bottommost surfaces; e) applying a spacecoat layer comprising polyvinyl butyral to said monolayer of microspheres, wherein said microsphere topmost surfaces are embedded in said binder layer and said microsphere bottommost surfaces are embedded in said spacecoat layer; f) applying a reflective material onto said spacecoat layer; and g) removing said forming support to yield said polymeric sheeting material and expose said multi-function layer second surface; and h) thermally printing a resin-based indicia upon the second surface of the multi-function layer using a resin based colorant/binder.

Frangible, retroreflective sheeting materials often are used to make outdoor-use articles, such as vehicular validation stickers. In order to improve the durability and/or weatherability of such frangible stickers, issuing authorities generally print repeating or incrementally changing information on a core sheeting material, followed by application of a clear coat to form a finished article. Such clear coats have been desired in order to bury or embed the indicia. The invention disclosed herein allows a durable thermal printing of indicia on a frangible, retroreflective sheeting material without the need for subsequent application of a clear coat. A further advantage is that an article of the invention may have indicia embedded in the resin as well as printed on top of the article. That is, some indicia may be provided on the core sheet while other indicia are subsequently formed on the upper, exposed surface of the multi-function layer using a thermally printed resin-based colorant/binder. For example, a validation sticker may have repeating or incrementally changing indicia provided on the core sheet and variable information indicia formed on the multi-function layer.

Retroreflective polymeric sheeting materials disclosed herein are advantageous in that such sheetings allow variable information indicia to be formed without having to add a clear coat after printing to protect indicia. The production of signage articles is thereby made much more convenient, particularly the production of large numbers of variable information articles. For example, sheetings can have item-specific indicia directly printed on articles in dispersed locations without the need for such locations to have clear coating equipment and facilities.

Directly printable sheetings disclosed herein may be used to make articles upon which formed indicia are easily varied from article to article. In particular, variation in the indicia printed on an article need not be a regular incremental change in an alphanumeric sequence. Instead, indicia may be varied in an item-specific manner, for example, by selecting article-specific indicia immediately prior to printing such indicia upon an article. Article-specific indicia may be generated based upon desired input criteria, such as registration status, name of individual requesting a printed article, printing date, expiration date, product number, warehouse location and the like. Combinations of criteria may be used also, and/or separate criteria may be used to form sub-elements of the formed indicia.

Bar-coded labels or stickers often are used to identify and maintain appropriate levels of inventory, for example, in a warehouse or distribution center. In addition to the use of labels for inventory control, durable and/or weatherable articles constructed from polymeric sheetings of the invention may also be frangible, in order to inhibit theft and/or transfer of labels from one item or package to another item or package. Security also may be enhanced by forming some portions of the variable information indicia in a random or otherwise unpredictable manner. Randomized variable information indicia for labeled packages then may be maintained in a secure central information storage system to inhibit fraud or theft.

The above and other aspects of the invention are more fully shown and described in the drawings and detailed description of this invention, where like reference numerals are used to represent similar pans. It is to be understood, however, that the description and drawings are for the purposes of illustration only and should not be read in a manner that would unduly limit the scope of this invention.

DETAILED DESCRIPTION OF PREFERRED EMBODIMENTS OF INVENTION

Figure 1:
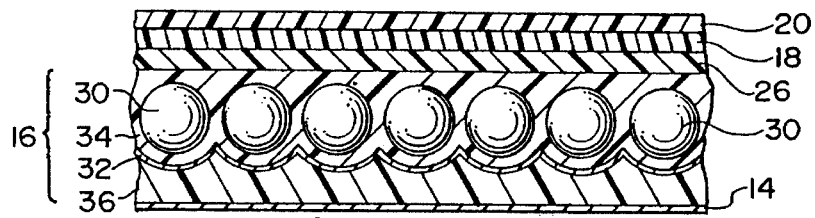
FIG. 1 is a schematic cross-sectional view of a known retroreflective sheeting material that is thermally print receptive.

In describing preferred embodiments of the invention, specific terminology will be used for the sake of clarity. The invention, however, is not intended to be limited to the specific terms so selected, and it is to be understood that each term so selected includes all the technical equivalents that operate similarly.

It would be desirable to have a layer on the topmost side of a sheeting that can have the functional properties of both a cover layer (and/or other layers such as a clear coat) and a print receptive layer. Such a topmost layer, referred to below as a multi-functional layer, could contribute to the durability necessary for extended life applications, could complete optical relationships if necessary for a retroreflective sheeting, could maintain frangibility if desired, could protect the underlying components of the sheeting and/or could contribute to the stability of the overall sheeting, while also being receptive to direct printing with a resin-based ribbon. The construction of sheetings having such a layer could be simpler than many known sheetings that require multiple layers to provide the functional properties of cover layers and/or clear coats and are not directly printable using resin-based colorant/binder.

A multi-function layer should be of a thickness that is appropriate for the applications in which sheetings and articles made therefrom will be used. For example, frangible articles are desired in certain applications. As used herein, the term "frangible" means the article can be easily damaged when an attempt is made to remove, alter, or otherwise deliberately tamper with the article. Frangible articles may have low tear strength, and/or brittleness, and/or be readily stretched or deformed (i.e., strained), so that tearing, cracking, stretching or deformation (strain) provides evidence, preferably to the unaided human eye, that an attempt has been made to tamper with the article. One example of measuring frangibility is discussed below in Example 3.

Frangible polymeric sheeting materials less than about 150 microns in thickness may exhibit residual evidence of physical tampering when a portion of the sheeting experiences a load which creates 25 percent strain of that portion. The load may be less than 7 pounds per inch of width (1.25 kilograms (kg) per centimeter (cm) of width). Frangible polymeric sheeting materials may exhibit residual evidence of physical tampering when a portion of the sheeting experiences a load at break of less than about 7 pounds per inch of width (1.25 kg per cm of width) and the sheeting is less than about 150 microns in thickness.

Durable and weatherable articles also may be formed in accordance with the present invention. As used herein, the term "durability" refers to characteristics such as solvent or chemical resistance, abrasion resistance, bond maintenance between the various layers of an article or between the indicia and the multi-function layer, and/or maintenance of retroreflective brightness under normal use conditions. As used herein, the term "weatherability" refers to characteristics such as maintenance of retroreflective brightness, resistance to dirt, resistance to yellowing and the like, all of the above under normal use conditions in the outdoors, where sunlight, temperature, and other environmental parameters may affect sheeting performance.

Figure 2:
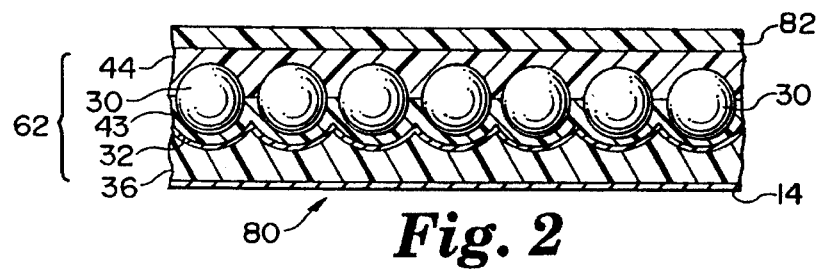
FIG. 2 is a schematic cross-sectional view of a retroreflective sheeting material in accordance with the present invention.

FIG. 2 illustrates a preferred embodiment of a retroreflective polymeric sheeting 80 of the present invention. Sheeting 80 comprises a removable protective liner 14 at the bottommost side, a core sheet that includes a representative beaded retroreflective element 62 and a multi-function layer 82. Retroreflective element 62 comprises pressure sensitive adhesive 36, a monolayer of microspheres 30 with underlying reflective material 32, space coat layer 43, and binder layer 44.

Sheeting 80 comprising multi-function layer 82 is directly thermally print receptive using resin-based colorant/binder. Furthermore, multi-function layer 82 contributes to other functional properties of polymeric sheetings of the invention. In durable, retroreflective, sheeting material 80, layer 82 may serve as a cover layer/clear coat. Layer 82 may complete optical relationships necessary to provide retroreflectivity. At a thickness of about 6 to about 35 microns, layer 82 may contribute to frangibility. Previously known frangible, retroreflective sheetings often used a 40 to 50 micron thick cover layer in addition to a 10 to 20 micron thick clear coat, for a total thickness of the upper layers of about 50 to about 70 microns.

The core sheet of sheeting 80 comprises retroreflective element 62 and removable protective liner 14. However, a core sheet may comprise only element 62, for example, when sheeting 80 is adhered to a substrate. A liner such as liner 14 may optionally be a part of a core sheet in other embodiments disclosed herein as well.

A multi-function layer should be of a thickness that is appropriate for the applications in which sheetings and articles made therefrom will be used. The multi-function layer may be from about 6 to about 35 microns in thickness, more preferably about 7 to about 25 microns in thickness. Such a thickness will contribute to durability while still retaining the frangible character of the article. A non-frangible, durable multi-function layer may be from about 20 to about 80 microns in thickness, preferably flora about 40 to about 60 microns in thickness.

A multi-function layer may be formed from a composition comprising polyurethane, for example, a water-borne dispersion of aliphatic polyurethanes, at from about 70 to about 100 parts by weight, preferably from about 80 to about 100 parts by weight. Illustrative examples of useful dispersions of polyurethane include NEOREZ™ R960 (an aqueous dispersion of aliphatic polyurethane believed to contain 53.5 parts by weight water, 33 parts aliphatic polyurethane with a weight average molecular weight between about 100,000 and 250,000, 16.8 parts N-methylpyrrolidone, and 1.6 parts triethylamine, from Zeneca Resins, Wilmington, Mass.) and NEOREZ™ R9637 (aqueous dispersion of aliphatic polyurethane from Zeneca Resins, believed to contain 48.6 parts by weight water, 36 parts aliphatic polyurethane with a weight average molecular weight between about 100,000 and 250,000, 8.5 parts N-methylpyrrolidone, and 2.0 parts triethylamine) and NEOREZ™ R9679 (aqueous dispersion from Zeneca Resins that is believed to be somewhat similar to R9637).

Multi-function layers may be formed from compositions having one or more crosslinkers in addition to a polyurethane. Crosslinkers may increase weatherability and chemical resistance of the multi-function layer. Examples of crosslinkers are melamine and aziridine. Aziridine crosslinkers may improve the tendency of the resultant top layer to lie flat and generally do not require high temperatures to cure. Melamine crosslinkers may provide a longer pot life and shelf life and are believed to be less hazardous for shipping. Blends of crosslinkers may be used, if desired.

When melamine is used as a crosslinker, compositions used to form multi-function layers of the invention may contain up to about 4 parts melamine (typically from about 8 to 12 weight percent based on resin solids). An illustrative example of a suitable melamine crosslinker is sold under the trade name RESIMENE AQ 7550 (an aqueous solution containing 78 to 80 parts methylated melamine formaldehyde and 20 to 22 parts water) from Monsanto, St. Louis, Mo.

When aziridine is used as a crosslinker, compositions used to form multi-function layers may contain up to about 5 parts aziridine (typically from about 10 to about 17 weight percent based on resin solids), preferably 2.8 parts aziridine or less. Compositions containing aziridine crosslinkers generally exhibit shorter pot life than those containing melamine crosslinker. However, sheetings formed from such compositions can be allowed to dry and cure without special heating. An illustrative example of a suitable aziridine crosslinker is sold under the trade name CX-100, a polyfunctional aziridine, believed to be 100 percent solids, from Zeneca Corporation.

Multi-function layer compositions used herein also may contain one or more of the following added components: ultraviolet light absorber, antifoaming agent, surfactant, rheology modifier, anti-skinning, leveling agent, coloring agent, mar agent, rust inhibitor, thickener, flow agent, ultraviolet light stabilizer and biocide. Co-solvents such as N-methylpyrrolidone also may be added, for example, at up to about 4 parts by weight. Such components should be compatible with the polyurethane.

An illustrative example of a suitable UV light stabilizer is TINUVIN™ 292, a hindered amine light stabilizer containing bis(1,2,2,6,6-pentamethyl-4-piperidinyl) sebacate and methyl-1,2,2,6,6-pentamethyl-4-piperidinyl sebacate, from Ciba-Geigy, Ardsley, N.Y. An illustrative example of a suitable UV light absorber is TINUVIN™ 1130, containing the reaction product of beta-[3-(2H-benzotriazol-2YL-4-hydroxy-5-tert-butylphenyl)] propionic acid, methyl ester and ethylene glycol 300, from Ciba-Geigy. An illustrative example of a suitable surfactant is FLUORAD™ FC-120 fluorochemical surfactant (Minnesota Mining and Manufacturing, St. Paul, Minn.) containing 25 parts ammonium perfluoralkyl sulfonate, 37.5 parts 2-butoxyethanol, and 37.5 parts water. An illustrative example of a suitable antifoaming agent is NALCO 2343, containing 40 to 70 parts straight run middle distillates, 10 to 50 parts blend of fatty acids, polyglycols, polyglycol ester, and oxyalkylate, and 10 to 20 parts kerosene, from Nalco Company, Chicago, Ill.

An embodiment of a composition that comprises an aqueous dispersion of a polyurethane, an aziridine crosslinker, a UV light stabilizer, a UV light absorber, surfactant, and antifoaming agent may comprise, for example, about 94.83 parts NEOREZ™ R960, 2.84 parts CX-100 aziridine crosslinker, about 0.63 parts TINUVIN™ 292 UV stabilizer, about 0.95 parts TINUVIN™ 1130 UV absorber, about 0.63 parts N-methyl pyrrolidone, about 0.03 parts Fluorad™ fluorochemical surfactant FC-120, and about 0.09 parts Nalco 2343 anti-foaming agent.

An alternative composition forming a multi-function layer of the invention may comprise an aliphatic polyurethane dispersion and an acrylic emulsion, for example, of polymethyl methacrylate. Multi-function layers formed from compositions comprising an aliphatic polyurethane and an acrylic emulsion generally cost less than compositions without acrylic emulsions. An illustrative example of an acrylic emulsion is NEOCRYL™ A-612 (an acrylic emulsion from Zeneca containing about 32 weight percent solids, 28.9 volume percent solids, about 54 weight percent water, and about 13.8 weight percent volatile organic compounds). Other illustrative emulsions include NEOCRYL™ A-601 and A-614. The emulsion preferably does not contain polystyrene. Multi-function layers made from compositions containing styrenated emulsions generally are not as weatherable as well as those containing emulsions that are not styrenated. The proportions of polyurethane and acrylic emulsion may be varied to suit the particular application in which the polymeric sheeting material is used. For example, the proportion of acrylic emulsion may be adjusted to achieve the desired brittleness of a multi-function layer (which enhances the frangibility of sheeting materials), to confer the desired level of adhesion to a particular core sheet, or to achieve the desired durability of the polymeric sheeting material. Suitable proportions can be determined by those skilled in the art and may be, for example, from greater than about 0 to about 60 parts acrylic emulsion and from about 40 to about 100 parts polyurethane, preferably from about 20 to about 50 parts acrylic emulsion and from 40 to about 80 parts polyurethane. Multi-function layers formed from compositions comprising a polyurethane dispersion and an acrylic emulsion preferably do not contain a crosslinker, because urethane/acrylic/crosslinker compositions generally do not form multi-function layers that are directly thermally printable with resin-based colorant/binder.

An embodiment of a polymeric sheeting material having a multi-function layer formed from a composition comprising an aqueous polyurethane dispersion and an acrylic emulsion is a composition comprising about 48.9 parts NEOREZ™ R9637 aliphatic polyurethane dispersion, about 48.9 parts NEOCRYL™ A-612 acrylic emulsion, about 0.6 parts TINUVIN™ 292 UV stabilizer, about 1.0 parts TINUVIN™ 1130 UV absorber, and about 1.0 parts N-methyl pyrrolidone.

Retroreflective polymeric sheeting in the core sheet may be, for example, "beaded sheeting" in the form of an encapsulated-lens sheeting (see, for example, U.S. Pat. Nos. 3,190,178; 4,025,159; 4,896,943; 5,064,272; and 5,066,098, the disclosures of which are incorporated here by reference), enclosed-lens sheeting (see, for example, U.S. Pat. No. 2,407,680, the disclosure of which is incorporated here by reference), or may comprise a cube corner retroreflective sheeting (see, for example, U.S. Pat. Nos. 3,684,348; 4,801, 193; 4,895,428; and 4,938,563, the disclosures of which are incorporated here by reference).

For example, in one embodiment of the invention the core sheet may comprise a binder layer at the topmost side, a spacecoat layer comprising polyvinyl butyral under the binder layer, a monolayer of microspheres having bottommost and topmost surfaces, the bottommost surfaces embedded in the spacecoat layer and the topmost surfaces embedded in the binder layer, a reflective material underlying the monolayer of microspheres and a pressure sensitive adhesive layer at the bottommost side. The binder layer may comprise, for example, a polyvinyl butyral or a synthetic polyester resin crosslinked with a butylated melamine resin. The thickness of the binder layer typically is about 20 to 120 microns thick. The microspheres typically are made of glass, have refractive indices of about 2.1 to 2.3, and have diameters ranging from about 30 to 200 microns, preferably averaging about 60 microns in diameter. The microspheres generally are embedded about 50 percent in the binder layer. The spacecoat layer typically has a thickness extending from the surface of the microsphere of approximately one fourth the average diameter of the microspheres. The reflective material may be a layer of metal flakes or vapor or chemically deposited metal layer such as aluminum or silver.

One method of forming a multi-function layer as part of a retroreflective polymeric sheeting material comprises:

a) providing a core sheet comprising retroreflective elements;

b) applying an aqueous composition comprising a polyurethane onto the core sheet; and c) drying and curing the composition to yield a polymeric sheeting material having a multi-function layer.

The method may be used to form a multi-function layer on any of a variety of core sheets, some of which may be retroreflective, such as encapsulated-lens, enclosed-lens, cube corner elements, and the like. A core sheet initially may be retroreflective, or it may provide retroreflection only after formation of the multi-function layer. The core sheet of a retroreflective sheeting material generally comprises a number of retroreflecting elements such as microspheres with associated specularly reflective layers or cube corner elements (such as microcube corner arrangements), typically arranged in a monolayer. In some instances, a core sheet may comprise indicia formed on the top side of the sheet. Such indicia are embedded underneath the multi-function layer in the polymeric sheeting material.

An advantage of the invention is that the multi-function layer compositions can be applied to a core sheet using many convenient techniques, including for example, dipping, spraying, flood coating, curtain coating, roll coating, bar coating, knife coating, wire-wound coating, gravure coating, or laminating to deposit a preferably continuous layer of coating composition on the surface of the core sheet. Persons skilled in the art can readily select one of these or other suitable application methods for specific uses. Polyurethane compositions useful in the invention do not have to be extruded to form multi-function layers. An advantage of the invention is that the relatively long pot life of multi-function layer compositions of the invention enables use of a variety of convenient application techniques without restrictions encountered with previously used coating compositions.

After application to the core sheet, the composition is dried and cured to make a polymeric sheeting material having an upper, exposed surface formed by the multi-function layer. Depending upon the nature of the composition, drying and curing may be performed at room temperature or at slightly elevated temperature without the use of special ovens or hoods. A multi-function layer may be formed in separate operations, if desired, by, for example, forming a first portion of the multi-function layer, allowing the first portion to dry and cure, and then repeating the process to form second and subsequent portions, all portions being considered part of the multi-function layer.

Multi-function layer compositions are advantageous in that polymeric sheeting materials may now be constructed with a single layer that not only contributes to functional properties formerly requiring multiple layers such as cover layers, clear coats and the like, but furthermore is directly printable using resin-based colorant/binder. The construction of sheetings by the methods of the invention may be greatly simplified. Preferred multi-function layer compositions described herein also offer other processing advantages, including being less flammable, being considered environmentally safer, and presenting less objectionable odor because they tend to have a lower volatile organic solvent content.

Alternatively, a polymeric sheeting material comprising a multi-function layer of the invention can be made by the steps of:

a) providing a removable forming support;

b) applying a composition comprising a polyurethane onto the removable forming support; and c) drying and curing the composition as described above to yield a multi-function layer.

The multi-function layer has a second surface disposed on the forming support and a first, exposed surface that is directly thermally printable with resin-based colorant/binder. The forming support has release properties that allow it to be removed and to expose the upper surface of the multi-function layer.

The method further comprises attaching a core sheet to the first surface of the multi-function layer and removing the forming surface support to make a retroreflective polymeric sheeting material. Such a sheeting material has the second surface of the multi-function layer exposed, and is directly thermally printable on the second surface. If desired, the attaching step may be carried out by providing an intermediate adherence layer between the core sheet and the multi-function layer. As indicated above, the core sheet may comprise encapsulated-lens, enclosed-lens, or cube corner retroreflective elements. For example, a core sheet may be comprised of encapsulated-lens retroreflective elements such as those described in U.S. Pat. No. 5,066,098, with a multi-function layer of the invention being the upper surface of the polymeric sheeting material. If desired, a retroreflective sheeting may be formed on the preformed multi-function layer, for example, by arranging a monolayer of microspheres in polymeric binder material, forming a space coat, and applying a reflector layer thereon. The indicia formed from resin-based colorant/binder may be thermally printed on the multi-function layer upper surface before or after attachment to the core sheet.

It may be desired to further increase the frangibility of sheeting materials disclosed herein, as generally described above and as particularly illustrated in Example 3. This may be done by an additional step modifying the retroreflective sheeting by, for example, exposing the sheeting to ultraviolet light or heat to increase sheeting brittleness.

The polyurethane dispersions discussed herein may contain some organic solvents, typically about 8 to 10 weight percent or less as co-solvents to facilitate mixing, handling and film formation. This limited quantity of solvent is much less than the amount of solvent used in many compositions heretofore. Previously used compositions sometimes contained approximately 60 to 70 weight percent or more of organic solvent.

Resin-based colorant/binder can be thermally applied directly to the exposed surface of the multi-function layer of sheetings disclosed herein. The result is indicia, generally informational, adhering to an upper portion of the sheeting, which in combination produces an article. Such articles may or may not be combined with additional components to create signage articles such as traffic control materials, retroreflective vehicle markings, retroreflective garments, indoor/outdoor labeling products, frangible security stickers, product authentication products, inventory labeling and control products, identification systems, or license plates.

Suitable means for transferring colorant/binder to a polymeric sheeting of this invention may include inkjet printing systems (including solid inkjet systems) and thermal transfer printing systems or a combination of such systems as in the thermally activated valves of an inkjet system. In the context of this invention, "thermal printing" means those processes which transfer resin-based colorant/binder to a polymeric sheeting by localized heat such as in the above-described systems. "Thermally print receptive" means the substrate (viz., multi function layer) is capable of being thermally printed thereon such that the resulting indicia is durable and has a quality that displays the intended image. Colorant/binder may be transferred by means of resistive elements, ribbon-contacting elements in a laser system, electronic elements, thermally activated valve elements, inductive elements, thermopile elements, and the like. Inkjet and thermal printing apparatuses suitable for use in this invention are referred to in copending U.S. application Serial No. 08/186, 752, filed Feb. 2, 1994, entitled "System And Method For Manufacturing Improved Data Display Retroreflective Sheeting, and incorporated here by reference.

A preferred means of transferring colorant/binder comprises heatable resistive elements in a thermal mass transfer printing system. Colorant/binder for use with thermal mass transfer printers generally is provided on a carrier or support, such as a ribbon. Carriers may have additives such as wetting or dispersing aids, defoamers, viscosity modifiers, leveling agents and coalescing agents. Binders carry colorant and hold colorant to the substrate sheeting after colorant is transferred. The type of binder determines whether or not the carrier will be termed wax-based, resin-based, or combination thereof.

Binders may comprise waxes such as paraffin, microcrystalline wax, beeswax, candelilla, ozocerite, or carbowax and the like. Waxes are low-melting organic mixtures or compounds of high molecular weight, solid at room temperature, and generally similar in composition to fats and oils, except that they contain no glycerides. Waxes are thermoplastic, but since they are not high polymers, they are not considered to be in the family of plastics. The thermoplastic properties of waxes make them excellent candidates for binders, since they tend to have sharp melting points, and are low in viscosity in the molten state. This allows colorant/binder to flow readily into paper fibers or onto films. Waxes are useful for printing, except that transferred wax-based colorant/binder may smear and scratch off of printed articles.

Other polymers may be substituted for waxes. Such binders generally are called resin-based binders. Resin binders in general do not have sharp melting points as waxes do, but they are tougher and do not smear or scratch like waxes. Resin-based colorant/binders may have some proportion of wax binders, for example, 5 weight percent or less, in order to adjust certain properties such as flow characteristics.

Sheetings comprising multi-function layers made from compositions disclosed herein are receptive to resin-based colorant/binder. The adhesion of colorant/binder to a particular sheeting and the quality of resulting indicia will vary somewhat among various resin-based colorant/binders.

The upper surface of retroreflective sheetings comprising multi-function layers preferably is sufficiently smooth to allow transfer of resin-based colorant/binder to the upper surface. The colorant/binder receptivity provided by multi-function layers greater than about 6 microns was surprising, because known cover layers generally are not receptive to a thermally printed resin-based colorant/binder or have unacceptable print quality. Further, polyurethane-containing prime layers about 2 microns thick generally are not thermally printable with resin-based colorant/binder. It was not expected that a polyurethane-containing layer greater than about 6 microns would behave significantly different from a 2 micron thick prime layer.

When using a thermal mass transfer printing system to apply indicia to the multi-function layer, the means for transferring colorant/binder preferably comprises a resin-based ribbon. When a wax-based ribbon is used to form indicia on the surface of a polymeric sheeting material, it is well-known in the art that a layer such as a clear coat generally must be applied to protect the indicia, as wax-based indicia are very susceptible to normal wear and tear or to damage when scratched. It has been difficult to achieve adherence of colorant/binder from resin-based ribbons to many retroreflective polymeric sheeting materials, a difficulty that has been overcome by the present invention.

Figure 3:
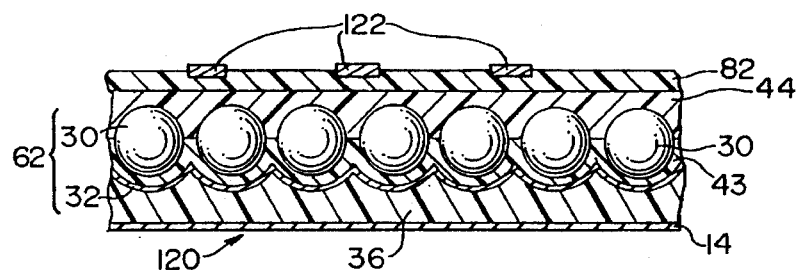
FIG. 3 is a cross-sectional view of a signage article in accordance with the present invention.
Figure 4:
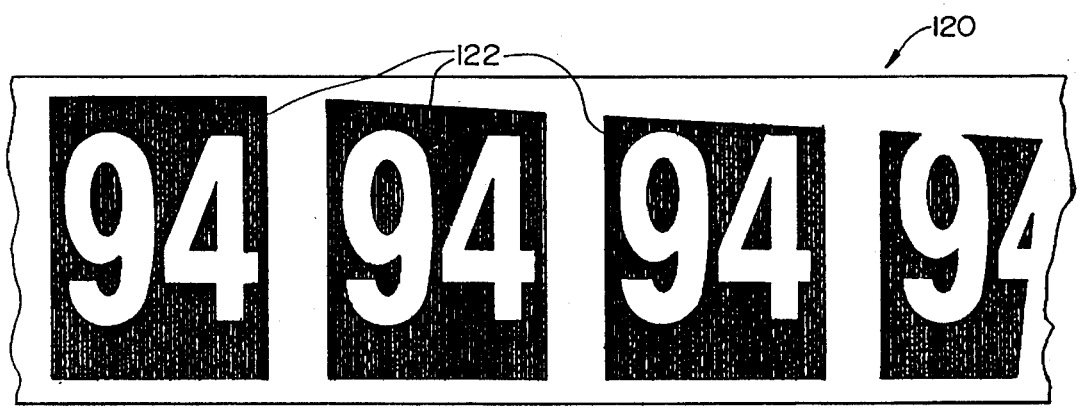
FIG. 4 is a top view of the signage article of FIG. 3.

An embodiment of a signage article is shown schematically in cross-section in FIG. 3, and in a top view in FIG. 4. Signage article 120 comprises indicia 122 and a core sheet that includes a retroreflective polymeric sheeting material 62 as described above. Indicia 122 may be formed from a resin-based colorant/binder, and multi-function layer 82 may be formed from, for example, a composition comprising an aqueous polyurethane dispersion. FIGS. 3 and 4 illustrate indicia 122 disposed above the topmost surface; however, a retroreflective article of the invention also may have the indicia located underneath the multi-function layer— although this is not necessary in some embodiments because in accordance with the invention an exposed resin-based indicia can be provided which is sufficiently durable by itself and therefore need not be buried in the signage article. As indicated above, variable thermally-printed indicia now may be durably printed on a polyurethane top surface of a retroreflective sheeting.

Figure 5:
FIG. 5 is a top view of a signage article in accordance with the present invention.

Another embodiment of a signage article is shown in top view in FIG. 5. Article 130 comprises indicia 132 and a polymeric retroreflective sheeting material similar to sheeting 80 shown in FIG. 2. A resin-based colorant/binder can form indicia 132, and the multi-function layer may be comprised of an aqueous polyurethane dispersion and an acrylic emulsion.

Figure 6:
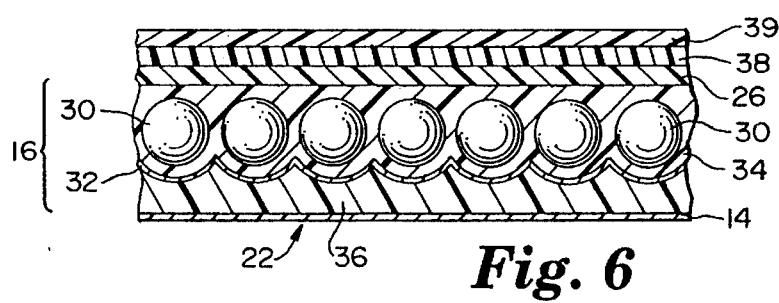
FIG. 6 is a cross-sectional view of an alternative embodiment of a retroreflective sheeting in accordance with the present invention.

FIG. 6 schematically illustrates another embodiment of a frangible, retroreflective polymeric sheeting material. Sheeting material 22 comprises removable protective liner 14, retroreflective element 16, pressure sensitive adhesive layer 26, thin layer 38, and colorant/binder-receptive print layer 39. Thin layer 38 generally is less than 10 microns in thickness and preferably about 6 microns in thickness. Thin layer 38 may be comprised of PET. Topmost layer 39 and thin PET layer 38 may be readily obtained as preformed product AZ SLP 31393, from Process Label Corporation, Minneapolis, Minn., and may be subsequently attached to adhesive layer 26. The underlying liner then is stripped off, and the conjoined layers 39, 38 and 26 are attached to the remainder of the sheeting material layers, for example, by laminating them.

The ability to form and adhere layers 39, 38 and 26 to the remainder of the sheeting material layers to form sheeting 22 was unexpected, due to the thinness of conjoined layers 39, 38 and 26. The fact that sheeting material 22 can be constructed at all allows articles to be made for applications in which enhanced frangibility and direct printability are desired.

A topmost layer 39 in accordance with the invention may comprise PET and a vinylidine chloride/acrylonitrile copolymer, for example, Goodyear "Vitel™ PE222 PET and Dow Saran™ 310F vinylidine chloride/acrylonitrile copolymer. Compositions used to form such print layers may range from 0 to 100 percent PET and from 100 to 0 percent vinylidine chloride/acrylonitrile copolymer.

The frangibility of sheeting 22 is at least partially due to the thinness of layer 38. Although layer 38 is made of relatively low cost materials such as PET, it would be desirable to simplify the construction of frangible sheeting materials and further, to construct frangible sheeting materials having enhanced durability and/or weatherability.

Figure 7:
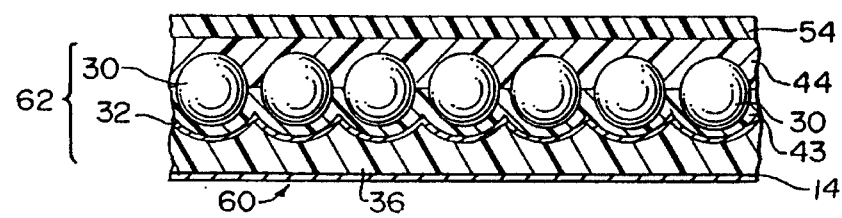
FIG. 7 is a cross-sectional view of an alternative embodiment of a retroreflective sheeting in accordance with the present invention.
Figure 8:
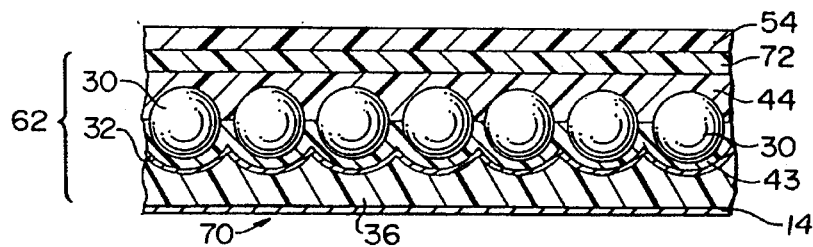
FIG. 8 is a cross-sectional view of an alternative embodiment of a retroreflective sheeting in accordance with the present invention.

Frangible sheetings having receptivity to direct thermal printing of resin-based colorant/binder are shown in FIGS. 7 and 8.

In reference to FIG. 7, polymeric sheeting material 60 comprises removable protective liner 14, retroreflective element 62, and a topmost layer 54 which is directly thermally print receptive to a resin-based colorant/binder. Retroreflective element 62 comprises pressure sensitive adhesive 36, a monolayer of glass microspheres 30 with underlying reflective layer 32, space coat layer 43 and synthetic polyester/ butylated melamine resin binder layer 44. Topmost layer 54 can be formed from a composition comprising about 7.5 percent Goodyear "Vitel™ PE222 polyethyleneterephtalate and about 1.9 percent Dow Saran™ 310F vinylidine chloride/acrylonitrile copolymer. Sheeting 60 is simpler to manufacture while still providing retroreflectivity, frangibility, and direct thermal printing using resin-based colorant/ binder.

FIG. 8 illustrates a frangible, retroreflective polymeric sheeting material that has good durability. Sheeting 70 comprises a removable protective liner 14, retroreflective element 62, cover layer 72, and colorant/binder-receptive topmost layer 54. Cover layer 72 may be formed from a composition comprising an aqueous dispersion of an aliphatic polyurethane and an acrylic emulsion. An illustrative example is a composition comprising about 47.4 percent Neorez™ R-9637 water-borne aliphatic urethane dispersion, about 47.4 percent Neocryl™ A-612 water-borne acrylic emulsion, about 3.6 percent N-methylpyrrolidone, about 0.6% TINUVIN™ 292, and about 1.0 percent TINUVIN™ 1130. Surprisingly, cover layer 72 adheres to binder layer 44 and topmost layer 54 adheres to cover layer 72. Cover layer 72 enhances durability and also may complete optical relationships needed for retroreflective sheeting material 70. Directly thermally print receptive sheetings as disclosed in FIG. 8 are useful, and may be configured to provide the desired combination of frangibility and retroreflectivity. Such sheetings may have enhanced durability and/or weatherability.

The above described embodiments of frangible retroreflective sheetings preferably employ an adhesive that provides a peel strength to a substrate which exceeds the bond strength between the various layers of the articles. In this way, the article can be rendered frangible (for example, becomes fractured or distorted) when an attempt is made to remove the article from the substrate. Typically, the adhesive is a pressure sensitive adhesive (PSA) such as a conventional PSA that comprises isooctylacrylate and acrylic acid.

Features and advantages of this invention are shown in the following illustrative Examples, selected for showing various embodiments of the invention in detail. It should be understood, however, that while the Examples serve this purpose, the particular amounts and ingredients recited therein, as well as other conditions and details, should not be construed to unduly limit the scope of this invention. Unless otherwise indicated, all amounts are expressed in the Examples are in weight percent.

EXAMPLE 1

This Example discloses polymeric sheeting materials that have a multi-function layer formed from a composition comprising polyurethane with or without crosslinker, and that are directly thermally print receptive using resin-based colorant/binder. The compositions from which the various multi-function layers (MFL) were formed are shown in Table 1.

TABLE 1

| | Composition Of Urethane Multi-Function Layers (MFL) With And Without Crosslinker | | | | | | | | | |
|---|---|---|---|---|---|---|---|---|---|---|
| MFL | R960[a] | R9637[b] | Azir[c] | Melam[d] | UV Stab[e] | UV Abs.[f] | NMP[g] Coslv | Surf[h] | AntiFoam[i] | Water |
| U1 | 100.0 | | | | | | | | | |
| U2 | 97.9 | | | | 0.59 | 0.88 | 0.59 | | | |
| U3 | | 100.0 | | | | | | | | |
| U4 | | 98.7 | | | 0.60 | 1.00 | 1.00 | | | |
| UX1 | | 95.79 | 1.85 | | 0.67 | 1.02 | 0.67 | | | |
| UX2 | 96.06 | | 1.70 | | 0.64 | 0.96 | 0.64 | | | |
| UX3 | 91.43 | | | 3.41 | 0.61 | 0.91 | 0.61 | 0.02 | 0.05 | 2.96 |
| UX4 | 94.17 | | | 3.51 | 0.63 | 0.94 | 0.63 | 0.03 | 0.09 | |
| UX5 | 91.70 | | 0.92 | 0.50 | 0.61 | 0.92 | 0.61 | 0.03 | 0.15 | 4.56 |
| UX6 | 94.83 | | 2.84 | | 0.63 | 0.95 | 0.63 | 0.03 | 0.09 | |
| UX7 | | 94.62 | 2.84 | | 0.69 | 1.04 | 0.69 | 0.03 | 0.09 | |
| UX8 | 93.11 | | 4.93 | | 0.56 | 0.84 | 0.56 | | | |
| UX9 | 96.25 | | 1.73 | | 0.58 | 0.87 | 0.58 | | | |
| UX10 | 97.37 | | 0.58 | | 0.58 | 0.88 | 0.58 | | | |

[a]NEOREZ R960, water-borne aliphatic urethane dispersion, Zeneca Resins
[b]NEOREZ R937, water-borne aliphatic urethane dispersion, Zeneca Resins
[c]CX-100 Aziridine crosslinker, Zeneca Resins

TABLE 1-continued

Composition Of Urethane Multi-Function Layers (MFL) With And Without Crosslinker

| MFL | R960[a] | R9637[b] | Azir[c] | Melam[d] | UV Stab[e] | UV Abs.[f] | NMP[g] | Coslv | Surf[h] | AntiFoam[i] | Water |
|---|---|---|---|---|---|---|---|---|---|---|---|

[d]Resimene ™ AQ7550 melamine crosslinker, Monsanto
[e]Tinuvin ™ 292, hindered amine, UV stabilizer, Ciba Geigy
[f]Tinuvin ™ 1130 UV light absorber, Ciba Geigy
[g]N-methylpyrrolidone coalescing solvent
[h]Fluorad ™ FC-120 fluorochemical surfactant, 3M Company
[i]Nalco 2343 ™ antifoaming agent, Nalco Chemical Test articles having multi-function layers formed from the compositions shown in Table 1 were prepared by notched bar or roll coating onto a core sheet and were allowed to dry and cure for about 5 minutes or less at room temperature, followed by heating for about 5 minutes at about 200° F. Compositions having melamine crosslinker received an additional 2 to 4 minutes at 300° F.

Some of the test articles (indicated as "A" in Table 2) in this Example had core sheet A on the bottommost side of the multi-function layer. Core sheet A comprised substantially a monolayer of glass microspheres having an average diameter of about 60 microns embedded in a layer of polyvinyl butyral that comprised polyvinyl butyral resin crosslinked through its hydroxyl groups to a substantially thermoset state and also contained a plasticizer. Underlying and spaced from the microspheres in the polyvinyl butyral was a specularly reflective layer. Underlying the reflective layer was a pressure sensitive adhesive layer, and a removable protective liner at the bottom.

Test articles (indicated as "B" in Table 2) had core sheet B, which comprised a binder layer of synthetic polyester resin crosslinked with a butylated melamine resin, a monolayer of glass microspheres whose topmost surfaces were embedded in the binder layer and bottommost surfaces were embedded in the spacecoat layer, a spacecoat layer of polyvinyl butyral, a reflector layer underlying and spaced from the microspheres by the spacecoat layer, a pressure sensitive adhesive layer, and a removable protective liner at the bottom.

Direct printability of the polymeric sheeting materials was evaluated by passing test articles through a TEK Bar Code Printer B-400™ or a Zebra 140™ thermal mass transfer printer in such a way as to test for printability of the upper surface of the multi-function layer. Printability was tested with a resin-based ribbon (R-1, from Japan Pulp and Paper Company (JPP-R1)) at a temperature setting of 18 and with moderate print head pressure. Printability was also tested with the same R-1 ribbon at a temperature setting of 22 and with high print head pressure. A Zebra 5099 resin-based ribbon (Zebra Company) was tested at a temperature setting of 18 and with moderate print head pressure. The test pattern was vertical and horizontal bar codes, and/or a block printing area of alphanumeric characters. Test articles were about 5 centimeters by 40 centimeters or larger.

Print quality was assessed visually for edge resolution, continuous coverage of colorant/binder, and density of the printed indicia by at least 2 people. Print quality was scored on a scale of 1 to 10, with 10 representing the best overall quality. If no colorant/binder or very little colorant/binder adhered to the article, the article was considered not printable, and print quality was scored as zero. A rating of 1 to 3 represented an unsatisfactory overall appearance of the printed indicia. A rating of 4 indicated minimally acceptable print quality. A rating of 5 or greater was considered preferable, with a rating of 6 or greater more preferable. Colorant/binder adhesion was evaluated by robbing a Faber-Castell "Magic-Rub™ 1054 or equivalent eraser over the surface of the article, and the number of eraser strokes required for visually discernible removal of the colorant from the top side of the article was noted. The results of the printing tests are shown in Table 2.

TABLE 2

| Core Sheet | MFL | Thickness (Microns) | JPP R-1-Ribbon High Pressure | | JPP R-1-Ribbon Moderate Pressure | | Zebra 5099-Ribbon Moderate Pressure | |
|---|---|---|---|---|---|---|---|---|
| | | | Print Quality | Eraser Strokes | Print Quality | Eraser Strokes | Print Quality | Eraser Strokes |
| A | U1 | 55 | 9 | 11 | 9 | 14 | 4 | 9 |
| A | U2 | 55 | 8 | 11 | N.D. | N.D. | 5 | 7 |
| B | U3 | 50 | 7 | 10 | 7 | 10 | 5 | 8 |
| B | U3 | 40 | 8 | 9 | 7 | 9 | 5 | 7 |
| B | U3 | 20 | 7 | 10 | 6 | 12 | 5 | 7 |
| B | U4 | 50 | 8 | 8 | 8 | 12 | 6 | 7 |
| A | UX1 | 62 | 6 | N.D. | N.D. | N.D. | N.D. | N.D. |
| A | UX2 | 62 | 9 | N.D. | N.D. | N.D. | N.D. | N.D. |
| A | UX3 | 37 | 4 | N.D. | N.D. | N.D. | N.D. | N.D. |
| A | UX4 | 25 | 5 | 12 | 4 | 9 | 3 | 6 |
| A | UX5 | 25 | 6 | 10 | 5 | 10 | 3 | 6 |
| A | UX6 | 35 | 7 | 10 | 6 | 12 | 3 | 8 |
| B | UX6 | 25 | 8 | 12 | 7 | 13 | 5 | 10 |
| A | UX6 | 35 | 7 | 7 | 6 | 9 | 3 | 5 |
| A | UX7 | 35 | 6 | 10 | 5 | 12 | 3 | 8 |
| A | UX8 | 75 | 6 | 11 | 5 | 15 | 0 | N.D. |
| A | UX9 | 70 | 8 | 11 | 8 | 13 | 1 | 7 |

TABLE 2-continued

|  |  |  | JPP R-1-Ribbon High Pressure | | JPP R-1-Ribbon Moderate Pressure | | Zebra 5099-Ribbon Moderate Pressure | |
| --- | --- | --- | --- | --- | --- | --- | --- | --- |
| Core Sheet | MFL | Thickness (Microns) | Print Quality | Eraser Strokes | Print Quality | Eraser Strokes | Print Quality | Eraser Strokes |
| A | UX10 | 75 | 9 | 10 | 8 | 12 | 3 | 8 |

N.D. = Not Done

The data set forth in Table 2 demonstrate that retroreflective sheetings of the invention are directly thermally print receptive to resin-based binders and are capable of forming durable resin-based indicia.

EXAMPLE 2

This example discloses polymeric sheeting materials that have a multi-function layer formed from compositions comprising a polyurethane dispersion and an acrylic emulsion that is directly printable. The compositions used to form the various multi-function layers are shown in Table 3.

TABLE 3

| Composition of Urethane/Acrylic Multi-Function Layers With And Without UV Stabilizer Or UV Absorber | | | | | |
| --- | --- | --- | --- | --- | --- |
| MFL | R9637[a] | A612[b] | UV Stab[c] | UV Abs.[d] | NMP Cosolv[e] |
| B2 | 50 | 50 | | | |
| B3 | 48.9 | 48.9 | 0.6 | 1 | 1 |

[a]NEOREZ R937, water-borne aliphatic urethane dispersion, Zeneca Resins
[b]Zeneca Neocryl A612, a water-borne acrylic emulsion, Zeneca Resins
[c]Tinuvin ™ 292, hindered amine, UV stabilizer, Ciba Geigy
[d]Tinuvin ™ 1130 UV light absorber, Ciba Geigy
[e]N-methylpyrrolidone coalescing solvent Test articles having multi-function layers MFL formed from compositions B2 and B3 were prepared as described in Example 1. Test articles were evaluated for direct printability with resin-based ribbons as described in Example 1. The results are shown in Table 4.

EXAMPLE 3

A test article was evaluated on a Sintech tensile tester for break load, percent strain at break, and load at 25 percent strain. One article comprised a core sheet B without the liner and a multi-function layer formed from a composition like B3 of Table 1, except that N-methylpyrrolidone was added at 3.6 parts by weight. Another test article comprised core sheet A without a liner and a multi-function layer formed from composition U1 shown in Table 1. Triplicate samples of each test article were evaluated. Samples had a width of 2.54 cm. The results are set forth in Table 5.

TABLE 4

|  |  |  | JPP R-1 High Pressure | | JPP R-1 Moderate Pressure | | Zebra 5099 Moderate Pressure | |
| --- | --- | --- | --- | --- | --- | --- | --- | --- |
| Core Sheet | MFL | Thickness (Microns) | Print Quality | Eraser Strokes | Print Quality | Eraser Strokes | Print Quality | Eraser Strokes |
| B | B2 | 37 | 6 | 10 | 5 | 12 | 4 | 7 |
| B | B3 | 40 | 7 | 12 | 6 | 10 | 5 | 10 |
| B | B3 | 12 | 6 | 11 | N.D. | N.D. | N.D. | N.D. |
| B | B3 | 12 | 7 | 10 | 5 | 7 | 4 | 7 |
| A | B3 | 7 | 6 | 9 | 5 | 9 | 4 | 7 |

N.D. = Not Done

The data in Table 4 demonstrate that retroreflective sheetings of the invention are directly thermally print receptive to resin-based binders and are capable of forming durable resin-based indicia.

TABLE 5

Measures Of Test Article Frangibility

| Core Sheet | MFL | Resin Printable | Frangible | Thickness[d] | Break Load[a] | Strain at Break (%)[b] | Load at 25% Strain[a] |
|---|---|---|---|---|---|---|---|
| B | B3' | Yes | Yes | 125 | 4.7 | 13.2 | —[c] |
| B | B3' | Yes | Yes | 125 | 2.8 | 15.3 | —[c] |
| B | B3' | Yes | Yes | 125 | 5.1 | 25.2 | 5.2 |
| A | U1 | Yes | Yes | 104 | 3.6 | 75 | 4.1 |
| A | U1 | Yes | Yes | 99 | 3.5 | 125 | 3.4 |
| A | U1 | Yes | Yes | 101 | 4.0 | 143 | 3.2 |

[a]Force in lbs.
[b]Length at break/length at start, in percent
[c]Test article broke before reaching 25 percent strain
[d]Approximate thickness of entire test article in microns The data set forth in Table 5 demonstrate that the retroreflective sheetings of the invention are frangible.

EXAMPLE 4

Polymeric sheeting materials were tested for durability and/or weatherability. Compositions used to form multi-function layers are shown in Table 6.

Test articles were evaluated by exposing them on an outdoor deck in Florida for approximately 12 months. The brightness of the articles was measured at the start and at the end of the exposure period with a retroluminometer as described in U.S. Defensive Publication T987,003 at an observation angle of 0.2° and an entrance angle of −4.0°. Sixty degree gloss was measured with a 60° glossmeter in a

TABLE 6

Composition of Multi-Function Layers Tested for Durability/Weatherability

| MFL | R960[a] | R9637[b] | Acryl A612 | UV Stab[c] | UV Abs.[d] | NMP Coslv[e] | Surf.[f] | Water | Ethanol |
|---|---|---|---|---|---|---|---|---|---|
| U10 | 89.1 | | | | | | 0.1 | 8.1 | 2.7 |
| B4 | | 47.4 | 47.4 | 0.6 | 1.0 | 3.6 | | | |
| B5 | | 48.2 | 48.2 | | | 3.6 | | | |

[a]NEOREZ R960, water-borne aliphatic urethane dispersion, Zeneca Resins
[b]NEOREZ R937, water-borne aliphatic urethane dispersion, Zeneca Resins
[c]Tinuvin ™ 292, hindered amine, UV stabilizer, Ciba Geigy
[d]Tinuvin ™ 1130 UV light absorber, Ciba Geigy
[e]N-methylpyrrolidone coalescing solvent
[f]Fluorad ™ FC-120 (leveling/wetting agent), 3M [0.03]; Nalco 2343, antifoaming agent, Nalco Chemical [0.07] (these are both generically called "surfactants")

The polymeric sheeting materials were configured as shown in Table 7. The core sheet for one test article comprised core sheet A described in Example 1, a cover layer of ethylene/acrylic acid and a prime layer. This test article had a multi-function layer formed from composition U10. The core sheet for two other of test articles comprised core sheet B; one had a multi-function layer formed from composition B4, and the other of the two had a multi-function layer formed from composition B 5.

manner similar to ASTM D523-85. Articles were tested in duplicate. Percent of initial brightness and gloss were determined for each sample by dividing the end values by the start values (× 100). The results are shown in Table 7.

TABLE 7

Measurement Of Durability/Weatherability

| Core Sheet | Cover Layer | Prime Layer | MFL | Thickness[b] | Brightness[a] Start | End | % | 60° Gloss Start | End | % |
|---|---|---|---|---|---|---|---|---|---|---|
| A | EAA | UX13 | U10 | 20 | 85 | 66 | 78 | 93 | 83 | 89 |
| A | EAA | UX13 | U10 | 20 | 84 | 68 | 81 | 94 | 87 | 93 |
| B | — | — | B4 | 18 | 95 | 68 | 72 | 80 | 59 | 74 |
| B | — | — | B4 | 18 | 95 | 68 | 72 | 80 | 60 | 75 |
| B | — | — | B5 | 20 | 95 | 27 | 29 | 84 | 59 | 70 |
| B | — | — | B5 | 20 | 98 | 29 | 29 | 84 | 57 | 68 |

[a]Candela/lux/meter²
[b]Approximate thickness of the topmost layer in microns

The data in Table 7 demonstrate that the multi-function layers of the invention are durable and weatherable.

Various modifications and alterations of this invention will become apparent to those skilled in the an without departing from the scope and spirit thereof. It should be understood, therefore, that the scope of this invention is not to be limited to the illustrative embodiments set forth herein, but is to be determined by the limitations set forth in the claims and equivalents thereof.

What is claimed is:

1. A durable, retroreflective polymeric sheeting comprising:
   (a) a frangible multi-functional layer having first and second major surfaces and a thickness of greater than about 6 microns, the multi-functional layer being formed from a composition comprising a polyurethane; and
   (b) a core sheet having first and second major surfaces, the first major surface of the core sheet being attached to the first major surface of the multi-functional layer, said core sheet comprising in order:
   1) a binder layer at said first major surface of said core sheet;
   2) a spacecoat layer comprising polyvinyl butyral under said binder layer;
   3) a monolayer of microspheres having bottommost and topmost surfaces, said bottommost surfaces embedded in said spacecoat layer and said topmost surfaces embedded in said binder layer;
   4) a reflective material underlying said monolayer of microspheres; and
   5) a pressure sensitive adhesive layer at said bottommost surface underlying said reflective material; wherein
   the polymeric sheeting is directly thermally print receptive upon the second major surface of the multi-functional layer using an indicia that contains a resin-based colorant/binder.

2. The polymeric sheeting material of claim 1, further comprising a thermally printed indicia disposed on the second major surface of the multi-function layer, the thermally printed indicia comprising a resin-based colorant binder.

3. The polymeric sheeting material of claim 1, wherein said binder layer is formed from a composition comprising synthetic polyester resin crosslinked with a butylated melamine resin.

4. The polymeric sheeting material of claim 1, wherein said multi-function layer is less than 35 microns in thickness and said sheeting material is frangible.

5. The polymeric sheeting material of claim 1, wherein said multi-function layer is formed from a composition comprising an aqueous aliphatic polyurethane dispersion.

6. The polymeric sheeting material of claim 6, wherein said multi-function layer is formed from a composition comprising from about 70 to about 100 parts by weight aqueous dispersion of polyurethane, said dispersion comprising from about 40 to about 60 parts of water and from about 20 to about 60 parts of aliphatic polyurethane.

7. The polymeric sheeting material of claim 6, wherein said multi-function layer is formed from a composition comprising from about 70 to about 100 parts by weight aqueous dispersion of polyurethane, said dispersion comprising from about 45 to about 55 parts of water and from about 30 to about 40 parts of aliphatic polyurethane.

8. The polymeric sheeting material of claim 5, wherein said multi-function layer composition further comprises up to about 5 parts by weight aziridine crosslinker.

9. The polymeric sheeting material of claim 5, wherein said multi-function layer composition further comprises up to about 4 parts by weight melamine crosslinker.

10. The polymeric sheeting material of claim 5, wherein said multi-function layer is formed from a composition comprising:
    a) from about 40 to about 100 parts by weight aqueous dispersion of polyurethane, said dispersion comprising from about 40 to about 60 parts of water and from about 20 to about 60 parts of aliphatic polyurethane; and
    b) from about 0 to about 60 parts by weight acrylic emulsion.

11. The polymeric sheeting material of claim 10, wherein said multi-function layer is formed from a composition comprising;
    a) from about 40 to about 100 parts by weight aqueous dispersion of polyurethane, said dispersion comprising from about 45 to about 55 parts of water and from about 30 to about 40 parts of aliphatic polyurethane; and
    b) about 0 to about 60 parts by weight acrylic emulsion.

12. The polymeric sheeting material of claim 1, further comprising resin-based colorant/binder directly applied to said multi-function layer upper surface.

13. The polymeric sheeting material of claim 12, wherein said sheeting material comprises a signage article that has a thermally printed indicia disposed on the second major surface of the multi-function layer, the thermally printed indicia comprising a resin-based binder system.

14. A signage article according to claim 13, wherein said multi-function layer is from about 6 microns to about 35 microns in thickness and said article is frangible.

15. A frangible, durable, retroreflective polymeric sheeting material, comprising:
    a) a frangible multi-function layer of greater than about 6 microns in thickness formed from a composition comprising from about 70 to about 100 parts by weight aqueous dispersion of polyurethane, said multi-function layer having first and second major surfaces, the second major surface being directly thermally print receptive with an indicia that contains a resin-based colorant/binder;
    b) a binder layer comprising synthetic polyester resin crosslinked with a butylated melamine resin and being attached to the first major surface of the multi-function layer;
    c) a spacecoat layer comprising polyvinyl butyral under said binder layer;
    d) a monolayer of glass microspheres embedded in the spacecoat layer and in the binder layer;
    e) a reflective material underlying said monolayer of glass microspheres; and
    f) a pressure sensitive adhesive layer disposed under the reflective material.

16. The polymeric sheeting material of claim 15, wherein said multi-function layer is formed from a composition comprising from about 90 to about 100 parts of weight aqueous dispersion of polyurethane, said dispersion comprising about 45 to about 55 parts of water and from about 30 to about 40 parts of aliphatic polyurethane.

17. A frangible, durable, retroreflective polymeric sheeting material, comprising:
    a) a frangible multi-function layer of greater than about 6 microns in thickness formed from a composition comprising from about 70 to about 100 parts by weight aqueous dispersion of polyurethane, said multi-function layer having a lower surface and an exposed, upper surface;
    b) a layer comprising polyvinyl butyral attached to said multi-function layer lower surface;

c) a monolayer of glass microspheres embedded in said polyvinyl butyral layer;

d) a reflective material underlying said monolayer of glass microspheres; and e) a pressure sensitive adhesive layer under said reflective material, said polymeric sheeting material being directly thermally print receptive upon said multi-function layer upper surface with an indicia that contains a resin-based colorant/binder.

18. The polymeric sheeting material of claim 17, wherein said multi-function layer is formed from a composition comprising from about 90 to about 100 parts of weight aqueous dispersion of polyurethane, said dispersion comprising about 45 to about 55 parts of water and from about 30 to about 40 parts of aliphatic polyurethane.

19. A frangible, durable, retroreflective polymeric sheeting material, comprising:

a) a frangible multi-function layer of greater than about 6 microns in thickness formed from a composition comprising from about 0 to about 60 parts by weight acrylic emulsion and about 40 to about 100 parts by weight aqueous dispersion of polyurethane, said multi-function layer having a lower surface and an exposed, upper surface;

b) a binder layer comprising synthetic polyester resin crosslinked with a butylated melamine resin attached to said multi-function lower surface;

c) a spacecoat layer comprising polyvinyl butyral under said binder layer;

d) a monolayer of glass microspheres having bottom most and topmost surfaces, said bottommost surfaces embedded in said spacecoat layer and said topmost surfaces embedded in said binder layer;

e) a reflective material underlying said monolayer of glass microspheres; and f) a pressure sensitive adhesive layer under said reflective material, said polymeric sheeting material being directly thermally print receptive upon said multi-function layer upper surface with an indicia that contains a resin-based colorant/binder.

20. The polymeric sheeting material of claim 19, wherein said multi-function layer is formed from a composition comprising from about 20 to about 50 parts of weight acrylic emulsion and about 40 to about 80 parts by weight aqueous dispersion of polyurethane, said dispersion comprising about 45 to about 55 parts of water and from about 30 to about 40 parts of aliphatic polyurethane.

21. A frangible, durable, retroreflective polymeric sheeting material, comprising:

a) a frangible multi-function layer of greater than about 6 microns in thickness formed from a composition comprising from about 0 to about 60 parts by weight acrylic emulsion and about 40 to about 100 parts by weight aqueous dispersion of polyurethane, said multi-function layer having a lower surface and an upper, exposed surface;

b) a layer comprising polyvinyl butyral attached to said multi-function layer lower surface;

c) a monolayer of glass microspheres embedded in said polyvinyl butyral layer;

d) a reflective material underlying said monolayer of glass microspheres; and e) a pressure sensitive adhesive layer under said reflective material, said polymeric sheeting material being directly thermally print receptive upon said multi-function layer upper surface using a resin-based colorant/binder.

22. The polymeric sheeting material of claim 21, wherein said multi-function layer is formed from a composition comprising from about 20 to about 50 parts of weight acrylic emulsion and about 40 to about 80 parts by weight aqueous dispersion of polyurethane, said dispersion comprising about 45 to about 55 parts of water and from about 30 to about 40 parts of aliphatic polyurethane.

23. A polymeric sheeting material according to any one of claims 4, 15, 17, 19, or 21, wherein said sheeting is less than about 150 microns in thickness and exhibits residual evidence of physical tampering when a portion of said sheeting experiences a load which creates 25 percent strain of said portion.

24. A polymeric sheeting material according to claim 23, wherein said load at 25 percent strain is less than about 7 pounds.

25. A polymeric sheeting material according to any one of claims 4, 15, 17, 19, or 21, wherein said sheeting is less than about 150 microns in thickness and exhibits residual evidence of physical tampering when a portion of said sheeting experiences a load at break of less than about 7 pounds.

26. A polymeric sheeting material according to any one of claims 12, 15, 17, 19, or 22, said multi-function layer formed from a composition further comprising an ultraviolet light stabilizer and an ultraviolet light absorber, said sheeting being weatherable.

27. A polymeric sheeting material according to any one of claims 12, 15, 17, 19, or 21, further comprising indicia underneath said multi-function layer.

28. A frangible retroreflective polymeric sheeting material, comprising:

a) a frangible topmost layer having a lower surface and an exposed, upper surface, said topmost layer formed from a composition comprising polyethyleneterephthalate and vinylidine chloride/acrylonitrile copolymer;

b) a cover layer attached to said lower surface; and c) a retroreflective core sheet attached to said cover layer, said retroreflective core sheet having first and second major surfaces, the first major surface of the core sheet being attached to said cover layer, said core sheet comprising in order:

i) a binder layer defining said first major surface of said core sheet;

ii) a spacecoat layer comprising polyvinyl butyral under said binder layer;

iii) a monolayer of microspheres having bottommost and topmost surfaces, said bottommost surfaces imbedded in said spacecoat layer and said topmost surfaces imbedded said binder layer;

iv) a reflective material underlying said monolayer of microspheres; and v) a pressure sensitive adhesive layer at said bottommost surface underlying said reflective material, said polymeric sheeting material being directly thermally print receptive upon said topmost layer upper surface using resin-based colorant/binder.

29. The polymeric sheeting material of claim 28, wherein said cover layer is less than about 10 microns in thickness and is formed from a composition comprising polyethyleneterephtalate.

30. The polymeric sheeting material of claim 30, wherein said sheeting is less than about 125 microns in a thickness and exhibits residual evidence of physical tampering when a portion of said sheeting experiences a load at break of less than about 15 pounds.

31. The polymeric sheeting material of claim 28, wherein said cover layer is formed from a composition comprising from about 40 to about 100 parts by weight of an aqueous dispersion of aliphatic polyurethane and from about 0 to about 60 parts by weight of an acrylic emulsion.

32. The polymeric sheeting material of claim 31, wherein said cover layer is formed from a composition comprising:
   a) from about 45 to about 50 parts of an aqueous dispersion of polyurethane, said dispersion comprising from about 45 to about 55 parts of water and from about 30 to about 40 parts of aliphatic polyurethane; and
   b) from about 45 to about 50 parts of acrylic emulsion.

33. The polymeric sheeting material of claim 28, further comprising resin-based colorant/binder directly applied to said topmost layer upper surface.

34. The polymeric sheeting material of claim 33, wherein said sheeting comprises a signage article.

35. The polymeric sheeting material of claim 1 or 28 wherein the sheeting is an encapsulated-lens retroreflective sheeting.

36. The polymeric sheeting material of claim 1 or 28 wherein the sheeting is a cube corner element retroreflective sheeting.

37. The polymeric sheeting material of any one of claims 28 or 34, wherein said sheeting is weatherable.

* * * * *

UNITED STATES PATENT AND TRADEMARK OFFICE
CERTIFICATE OF CORRECTION

PATENT NO.: 5,508,105

DATED: April 16, 1996

INVENTOR(S): Bruce D. Orensteen et al.

It is certified that error appears in the above-identified patent and that said Letters Patent is hereby corrected as shown below:

In Column 3, Line 7, the word "polyethyleneterephtalate" should read --polyethyleneterephthalate--.

In Column 4, Line 32, the word "polyethyleneterephtalate" should read --polyethyleneterephthalate--.

In Column 4, Line 40, the word "polyethyleneterephtalate" should read --polyethyleneterephthalate--.

In Column 9, Line 5, the last word "pans" should read --parts--.

In Column 9, Line 6, the word "pans" should read --parts--.

In Column 9, Line 8, both words "pans" should read --parts--.

In Column 11, Line 37, the second word "comer" should read --corner--.

In Column 15, Line 35, the word "polyethyleneterephtalate" should read --polyethyleneterephthalate--.

In Column 18, Line 39, the word "robbing" should read --rubbing--.

In Column 26, Line 24, insert --1, -- before the number "12", and the number "22" should read --21--.

In Column 26, Line 29, insert --1, -- before the number "12".

In Column 26, Lines 61-62, the last word "polyethyleneterephtalate" should read --polyethylenterephthalate--.

In Column 26, Line 63, the number "30" should read --29--.

In Column 27, Line 8, insert a space between the word "about" and the number "50".

UNITED STATES PATENT AND TRADEMARK OFFICE
CERTIFICATE OF CORRECTION

PATENT NO. : 5,508,105
DATED : April 16, 1996
INVENTOR(S) : Bruce D. Orensteen et al.

It is certified that error appears in the above-indentified patent and that said Letters Patent is hereby corrected as shown below:

In Column 28, Line 12, the number "34" should read --33--.

Signed and Sealed this

Fifth Day of November, 1996

BRUCE LEHMAN

Attest:

Attesting Officer

Commissioner of Patents and Trademarks